(12) United States Patent
Montesello et al.

(10) Patent No.: US 9,254,719 B2
(45) Date of Patent: Feb. 9, 2016

(54) PNEUMATIC TIRE

(75) Inventors: Stefano Montesello, Milan (IT);
Gianfranco Colombo, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 564 days.

(21) Appl. No.: 13/133,639

(22) PCT Filed: Dec. 10, 2008

(86) PCT No.: PCT/IT2008/000757
§ 371 (c)(1),
(2), (4) Date: Aug. 26, 2011

(87) PCT Pub. No.: WO2010/067389
PCT Pub. Date: Jun. 17, 2010

(65) Prior Publication Data
US 2011/0297284 A1    Dec. 8, 2011

(51) Int. Cl.
  B60C 11/13    (2006.01)
  B60C 11/12    (2006.01)
  B60C 11/03    (2006.01)

(52) U.S. Cl.
  CPC ......... *B60C 11/0304* (2013.04); *B60C 11/033* (2013.04); *B60C 11/0306* (2013.04); *B60C 11/0309* (2013.04); *B60C 11/1263* (2013.04); *B60C 11/1307* (2013.04); *B60C 2011/0369* (2013.04); *B60C 2011/1209* (2013.04); *B60C 2011/133* (2013.04); *B60C 2011/1338* (2013.04)

(58) Field of Classification Search
  CPC .............. B60C 11/0304; B60C 11/033; B60C 11/1307; B60C 2011/133; B60C 2011/1338
  USPC ................. 152/209.8, 209.9, 209.18, 209.27, 152/209.28, DIG. 3
  See application file for complete search history.

(56) References Cited

U.S. PATENT DOCUMENTS 4,574,856 A * 3/1986 Graas ....................... 152/209.18
5,358,021 A * 10/1994 Takasugi et al. ........... 152/209.8
(Continued)

FOREIGN PATENT DOCUMENTS

EP        0788898    *    8/1997
EP        1529659    *    5/2005
(Continued)

OTHER PUBLICATIONS

English machine translation of EP0788898, dated Aug. 1997.*
(Continued)

*Primary Examiner* — Richard Crispino
*Assistant Examiner* — Robert Dye
(74) *Attorney, Agent, or Firm* — Finnegan, Henderson, Farabow, Garrett & Dunner, L.L.P.

(57) ABSTRACT

A motor car tire having a tread includes a central portion situated on either side of an equatorial plane and two shoulder portions. The central portion is separated from the shoulder portions of the tread by two circumferential grooves and has at least one circumferential rib situated between a first and a second circumferential groove. The tread has a solid/void ratio of less than 0.28. The circumferential rib includes transverse grooves which extend over at least 50% of its width. The transverse grooves include at least one curvilinear section, have a width less than that of the circumferential grooves and at least one of the circumferential grooves including the circumferential rib has at least one side wall defining an undulating profile.

27 Claims, 7 Drawing Sheets

(56) References Cited

U.S. PATENT DOCUMENTS

| | | | | |
|---|---|---|---|---|
| 5,423,364 | A | * | 6/1995 | Himuro .................... 152/209.18 |
| 5,658,404 | A | * | 8/1997 | Brown et al. ............... 152/209.8 |
| 6,340,040 | B1 | * | 1/2002 | Ikeda ...................... 152/209.18 |
| 6,371,180 | B1 | * | 4/2002 | Hayashi ..................... 152/209.2 |
| 6,439,286 | B1 | * | 8/2002 | Baumhofer et al. ....... 152/209.8 |
| 6,554,034 | B1 | * | 4/2003 | Minami ................... 152/209.22 |
| 7,093,631 | B2 | * | 8/2006 | Colombo et al. .......... 152/209.8 |
| 7,207,364 | B2 | * | 4/2007 | Hildebrand .............. 152/209.18 |
| 7,434,606 | B2 | * | 10/2008 | Miyabe et al. ............. 152/209.2 |
| 8,210,220 | B2 | * | 7/2012 | Nagai et al. ................ 152/209.3 |
| 2006/0090828 | A1 | * | 5/2006 | Yamane ................... 152/209.18 |
| 2006/0207702 | A1 | * | 9/2006 | Miyazaki ................. 152/209.18 |
| 2009/0272474 | A1 | * | 11/2009 | Nagai et al. .............. 152/209.18 |

FOREIGN PATENT DOCUMENTS

| | | | |
|---|---|---|---|
| EP | 1619048 | * | 1/2006 |
| EP | 1 695 843 A1 | | 8/2006 |
| JP | 57-077203 | * | 5/1982 |
| JP | 01-095913 | * | 4/1989 |
| JP | 10-278512 | | 10/1998 |
| JP | 2002-225511 | | 8/2002 |
| JP | 2004-155416 | | 6/2004 |
| JP | WO2007/072824 | * | 6/2007 |
| WO | WO 01/02194 A1 | | 1/2001 |

OTHER PUBLICATIONS

International Search Report from the European Patent Office for International Application No. PCT/IT2008/000757, mailing date Sep. 2, 2009.

Second Office Action from the State Intellectual Property Office of the People's Republic of China (16 pages).

* cited by examiner

PNEUMATIC TIRE

CROSS REFERENCE TO RELATED APPLICATION

This application is a national phase application based on PCT/IT2008/000757, filed Dec. 10, 2008, the content of which is incorporated herein by reference.

BACKGROUND OF THE INVENTION

1. Field of the Invention

The present invention relates to a motor car tyre, in particular a tyre intended for motor cars with a low-to-middle engine capacity, for example 1000-1400 cm$^3$.

This type of motor car is used for short trips around town as well as short journeys out-of-town.

2. Description of the Related Art

Usually, the tyres for this class of motor vehicle, in addition to having good traction and braking properties on dry and wet road surfaces, must be able to ensure soft handling along urban routes, high mileage, reduced petrol consumption, and acoustic and plastic comfort.

Motor vehicle tyres with a tread which has blocks delimited by circumferential grooves, extending in a substantially longitudinal direction, and transverse grooves, extending in a substantially axial direction, are known. The blocks resulting from the intersection of these grooves have suitably designed varying forms and are arranged in adjacent circumferential rows, each of which is situated between two successive circumferential grooves.

The circumferential grooves may influence the steering and travel stability characteristics of the tyre in connection with the lateral (drift) thrusts directed parallel to the axis of rotation of the tyre.

The transverse grooves, in turn, may influence the tractional properties of the tyre, namely its capacity to transmit to the road surface the tangential thrusts parallel to the direction of travel, during acceleration and braking of the motor vehicle.

The circumferential and transverse grooves may also influence the water drainage in the area of contact with the road surface (contact area) during travel on a wet road surface.

JP 10-278512 describes a tyre for high-performance vehicles, provided with a circumferential central rib, circumferential central grooves, rows of central blocks and rows of blocks on both the side portions. The rows of central blocks are formed with blocks which have a circumferential dimension equal to 2 to 4% of the total circumferential length of the tyre, and the rows of blocks on both the side portions are formed with blocks which have a circumferential dimension equal to 1 to 2% of the circumferential length.

The rows of blocks on both the side portions are provided with grooves which are inclined with respect to the circumferential direction. The inclined grooves form obtuse angles with the circumferential grooves on both sides of the blocks.

JP 2004-155416 proposes a motor vehicle tyre and in particular a tyre for a passenger motor vehicle which has different tread pattern portions: in particular, an inner half tread band directed towards the inside of the vehicle and a half tread band directed towards the outside of the vehicle when the tyre is mounted on the vehicle. The total area of the recessed portion of the inner half tread band is designed to be greater than that of the recessed portion of the outer half tread band. The inner half tread band is provided with at least one circumferential groove which extends in a substantially circumferential direction. The outer tread band half is provided with two circumferential grooves which extend in a substantially circumferential direction.

SUMMARY OF THE INVENTION

The Applicant has noted that a high number of transverse grooves of greater width improves the traction especially on wet surfaces and ensures good flexibility of the block itself, but an excessive use may adversely affect the performance on dry surfaces and increase the noise level of the tyre. In fact, one of the main causes of noisiness is the continuous successive striking of the edges of the blocks on the road surface.

The Applicant has also noted that the transverse grooves of greater width tend to weaken structurally the tread band, negatively affecting the steering and mileage properties of the tyre and favouring the "sawtooth" effect.

It is the opinion of the Applicant that the mileage of a tyre is also influenced by the structure of the tread pattern.

The Applicant has in fact noted that a reduction in the total quantity of rubber subject to wear results in a substantial reduction in the working life of the tyre.

It is also the opinion of the Applicant that, in order to manage to maintain a high level of safety in all conditions of use, the tyre must have excellent braking properties (both on dry and wet surfaces), but also an optimum resistance to aquaplaning: two mutually conflicting characteristics since a low solid/void ratio is required for braking, but also an adequate number and in particular an adequate width of the grooves is required in order to ensure good water drainage.

The Applicant has also noted that normally the depth of the transverse grooves in tyres of the known art is generally smaller in the case of summer tyres compared, for example, to a winter tyre. On the other hand it is the opinion of the Applicant that, also in the case of tyres of this type, the depth of the transverse recesses cannot be reduced excessively since directly linked to the aquaplaning resistance and mileage properties of the tyre.

The Applicant has noted that the mutually conflicting problems mentioned above are solved by means of a tread pattern with a smaller solid/void ratio comprising transverse grooves of smaller width having a progression such as to ensure excellent traction/braking properties both along the straight and around bends. Moreover, the pattern may comprise grooves in the axially intermediate and/or inner zones of the tyre which, as well as being intended to evacuate water from the contact area, are specially designed to ensure greater grip in particular on wet surfaces and, at the same time, reduce the aquaplaning effect around bends.

More particularly, according to one aspect the present invention relates to a motor car tyre having a tread comprising a central portion situated on either side of an equatorial plane and two shoulder portions, the central portion being separated from the shoulder portions of the tread by two circumferential grooves; the said central portion having at least one circumferential rib situated between two circumferential grooves, characterized in that said tread has a solid/void ratio of less than 0.30; the circumferential rib extends on either side of the equatorial plane and comprises transverse grooves which extend over at least 50% of the width of the said circumferential rib; the transverse grooves comprising at least one curvilinear section; said transverse grooves having a width less than that of the circumferential grooves; said circumferential rib has at least one side wall with an undulating profile.

In the present description and in the following claims "extension of the transverse grooves" is understood as meaning the length of projection of the abovementioned groove along a straight line perpendicular to the equatorial plane.

The present invention, according to the aforementioned aspect, may have at least one of the preferred characteristics which are described herein below.

Preferably, the side wall may define on the circumferential rib an undulating profile comprising a plurality of cusps alternating with curvilinear portions.

The transverse grooves may be positioned circumferentially at the cusps.

The transverse grooves may have a variable width along their extension.

The circumferential rib may comprise two portions (Z1, Z2) with a different solid/void ratio.

More particularly, the portion (Z1) extends on either side of the equatorial plane and has a smaller solid/void ratio smaller than the portion (Z2) which extends in an axially outermost position of the circumferential rib.

The smaller solid/void ratio of the portion (Z1) results in a greater robustness in the central zone of the tyre, therefore ensuring a greater contact area and consequently an improved performance along the straight and on dry surfaces, as well as more regular wear and a reduction in the noisiness.

In order to increase the rigidity of the axially innermost portion of the circumferential rib, the latter has only a plurality of first substantially transverse sipes.

Here and below the term "sipes" is understood as meaning "thin" grooves which are not very wide and which may also not be very deep.

Advantageously, the first substantially transverse sipes extend from a transverse groove towards a circumferential groove.

The circumferential rib may also have a plurality of second transverse sipes.

The second transverse sipes extend from the axially outermost circumferential groove.

According to an advantageous design, the central portion L1 has a second circumferential rib situated between two circumferential grooves.

The abovementioned second circumferential rib may have a side wall with an undulating profile.

In this case also, the undulating profile of the side wall of the circumferential rib increases the area of extension of the side wall portion situated between two transverse grooves, providing greater grip in particular on wet surfaces and reducing, at the same time, the aquaplaning effect around bends.

The rib may comprise a plurality of sipes which extend over at least 50% of the width of the said second rib.

Advantageously, the sipes of the abovementioned plurality extend from a circumferential groove towards the axially adjacent groove.

According to a particularly advantageous design the sipes may have a variable depth along their extension.

In particular, the sipes have a maximum depth in the axially central most portion of the circumferential rib.

The sipes of the first and/or the second rib may have a maximum depth of less than 8 mm.

The particular size of the sipes ensures a large quantity of "ground contact rubber" along the circumferential rib and therefore a low solid/void ratio and consequently optimum soft handling properties and low noise levels.

Conveniently at least one shoulder portion has a plurality of substantially transverse grooves able to define a circumferential row of blocks.

Preferably, the transverse grooves have a variable depth along their extension.

Preferably, the transverse grooves have a smaller depth along an axially inner edge.

This stepwise progression of the transverse shoulder grooves provides the block with rigidity in the axial direction and reduces the possible problems of irregular wear along the edges of the block.

According to an advantageous design at least one shoulder portion has a plurality of substantially longitudinal grooves.

The substantially longitudinal grooves extend between two circumferentially consecutive transverse grooves.

Such an extension and arrangement of the substantially longitudinal grooves provides the blocks with mobility in the transverse direction, increasing the comfort.

At least one shoulder portion has a plurality of sipes.

Advantageously the sipe of the abovementioned plurality has at least one first and one second straight section and at least one curvilinear connecting section.

Preferably the first straight section is substantially perpendicular to the equatorial plane.

The second straight section has a prechosen inclination with respect to the equatorial plane.

In order to ensure optimum drainage, the circumferential grooves have a width ranging between 5 and 16 mm, ends included, and a depth ranging between 5 and 11 mm, ends included.

The tyre according to the invention has an optimum grip on a wet road surface, very low noise levels, a high comfort level and an optimum travel behaviour on a dry road surface.

BRIEF DESCRIPTION OF THE DRAWINGS

Characteristic features and advantages of the invention will now be described with reference to embodiments shown purely by way of a non-limiting example in the accompanying figures in which.

DETAILED DESCRIPTION OF THE INVENTION

Figure 1:
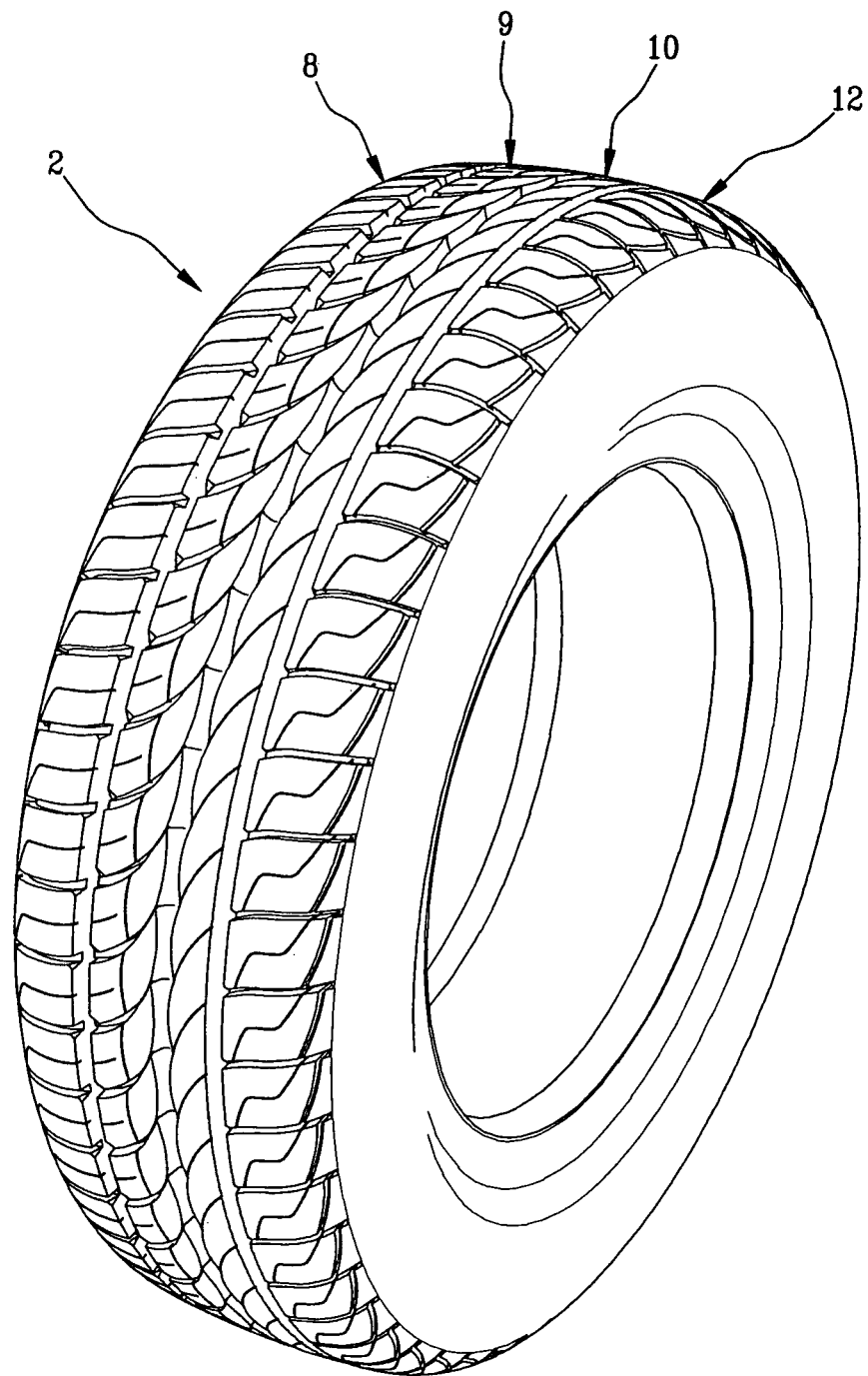
FIG. 1 is a perspective view of a tyre with a tread formed according to an example of the invention.
Figure 2:
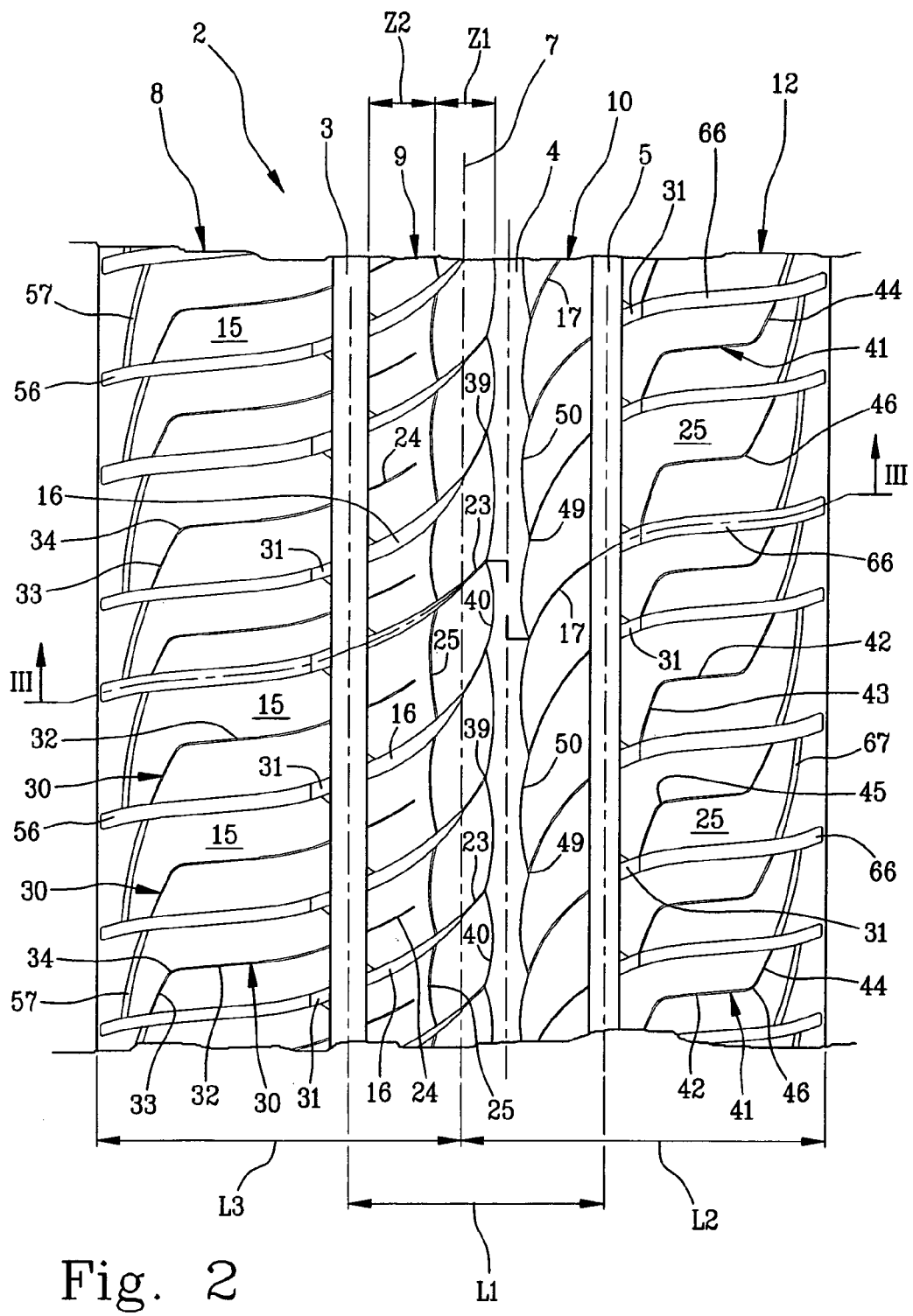
FIG. 2 is a plan view of the tread of the tyre according to FIG. 1.
Figure 3:
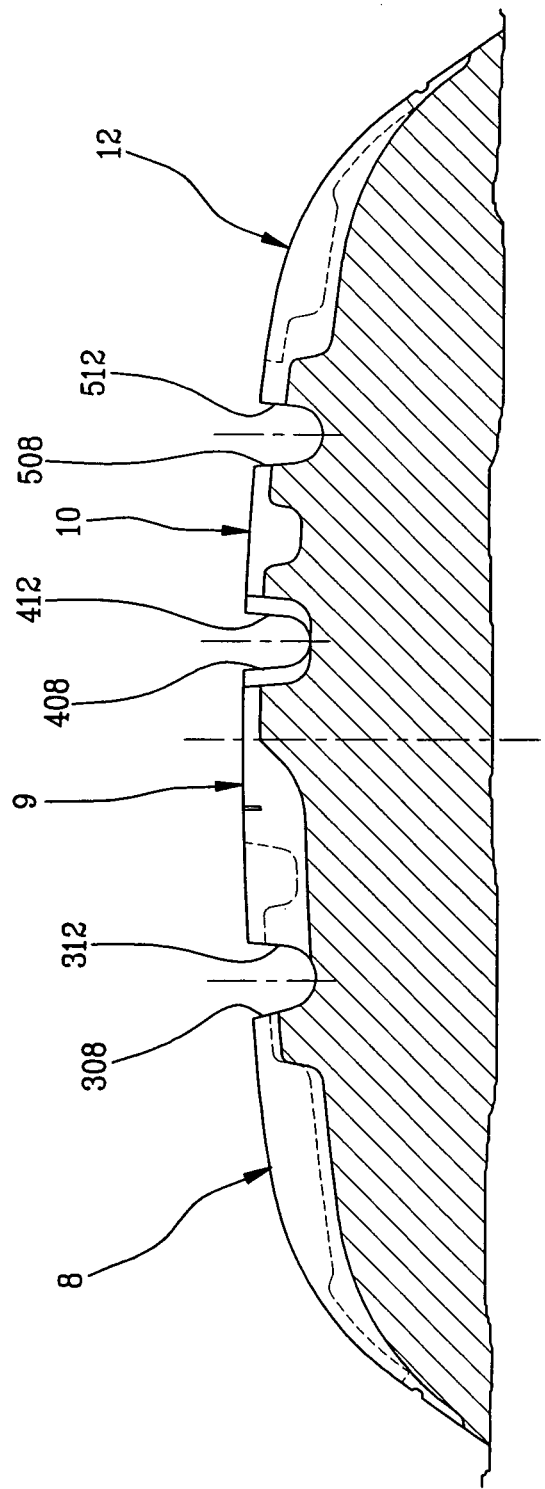
FIG. 3 is a cross-sectional view of the tread according to FIG. 2 along the broken dashed line of FIG. 2.

FIGS. 1, 2 and 3 show a tyre 1 provided with a first embodiment of the tread 2 according to the present invention.

The structure of the tyre 1 is per se of the conventional type and comprises a carcass, a tread band situated on the crown of the carcass, a pair of axially opposite side walls terminating in beads reinforced with bead wires and associated bead fillers. The tyre also preferably comprises a belt structure arranged between the carcass and tread band.

The carcass is reinforced with one or more carcass plies secured to the bead wires, while the belt structure comprises two belt strips radially superimposed on each other. The belt strips are formed by portions of rubberised fabric incorporating metal cords which are parallel to each other in each strip and intersect the cords of the adjacent strips, being inclined preferably symmetrically with respect to the equatorial plane.

Preferably, the belt structure also comprises a third zero-degree belt strip, in a radially outermost position, provided with cords directed substantially parallel to the equatorial plane. The cords in the zero-degree belt are preferably textiles or even more preferably made of heat-shrinkable material. The tyre 1 preferably has a relative ratio H/C of the height of the right-angled section and maximum width of the largest cross-section greater than 0.40, and preferably less than 0.80.

The tread 2 has a design of an asymmetrical type, namely operates in a more efficient manner when the tyre 1 is mounted on the motor car in a given direction rather than in the opposite direction. In other words, the tyre preferably has an inner side (car side) and an outer side.

In order to ensure a high travel mileage and at the same time an optimum performance, in particular in terms of steering, for the entire working life of the tyre, the tread 2 preferably has a solid/void ratio which is small, i.e. less than 0.30 and for example equal to about 0.25.

The tread 2 is provided with circumferential grooves 3, 4 and 5 (FIG. 2) which extend in the longitudinal direction and are parallel to the equatorial plane 7 of the tyre.

The tread 2 includes a central portion L1 and two shoulder portions 8, 12. The central portion L1 has two circumferential ribs 9, 10. The shoulder portion 8 is separated from the rib 9 by means of the circumferential groove 3. The rib 9 is situated between the circumferential grooves 3 and 4. The rib 10 is situated between the circumferential grooves 4 and 5. The shoulder portion 12 is separated from the rib 10 by means of the groove 5.

The circumferential grooves 3, 4 and 5 have a width which ranges from about 5 mm to about 16 mm. The circumferential grooves 3, 4 and 5 have a depth of between about 5 mm and about 11 mm.

Preferably the axially outermost circumferential groove 3 of the tread has a width greater than that of the grooves 4, 5.

In detail, the width of the circumferential groove 3 may be in the range of between 6 and 13 mm, while the circumferential grooves 4 and 5 are the grooves which have a width of between 5 and 12 mm. The circumferential groove 3 may have a depth less than 10 mm, preferably greater than 5 mm, and for example equal to 7.7 mm.

Alternatively, the circumferential grooves could all have the same width and/or depth without departing from the scope of protection of the present invention.

As can be seen in FIG. 3, the axially outer side wall 308 of the circumferential groove 23 has an inclination, with respect to the centre axis of the said groove 3, greater than the inclination of the opposite axially inner wall 312.

By way of example, the side wall 308 may have an inclination of about 15° with respect to its centre axis, while the opposite wall 312 may have an inclination of about 5° with respect to the centre axis of the same groove 3.

The circumferential groove 4 has a depth less than 10 mm, preferably greater than 5 mm, and even more preferably equal to 7.7 mm. The axially outer side wall 408 of the circumferential groove 4 has an inclination, with respect to the centre axis of the said groove 4, approximately equal to the inclination of the opposite axially inner wall 412.

By way of example, the side wall 408 of the circumferential groove 4 may have an inclination of about 5° with respect to its centre axis, while the opposite side wall 412 may have an inclination of about 5° with respect to the centre axis.

The circumferential groove 5 may have the same depth as the groove 4 and side walls 508, 512 with a symmetrical mirror-image inclination.

In detail, the side wall 508 as well as the side wall 512 of the circumferential groove 5 may have an inclination of about 5° with respect to its centre axis.

As previously mentioned, the circumferential grooves 3, 5 separate the central portion L1 of the tread from the shoulder portions 8, 12, while the circumferential groove 4 separates the central portion L1 of the tread into circumferential ribs 9, 10.

The equatorial plane 7 divides the tread 2 into two half-regions, an axially inner half-region L2 and an axially outer half-region L3 positioned on the outer side of a motor car when the tyre 1 is mounted on said motor car. The axially outer half-region L3 has a solid/void ratio smaller than that of the axially inner half-region L2. The solid/void ratio of the half-region L2 is smaller than or equal to 0.16.

The circumferential rib 9 comprises transverse grooves 16 which extend from the circumferential groove 3 over at least 50% of the width of the circumferential rib. Preferably, the transverse grooves 16 do not extend over the entire width of the rib, but only over about 70 to 80% thereof. A thin sipe, consisting of the sipes 23, may be provided over the remainder of the extension of the rib.

The transverse grooves 16 have a width smaller than that of the circumferential grooves and 3, 4, 5. In detail, the transverse grooves 16 have a maximum width less than or equal to 6 mm, preferably less than 5 mm, and for example equal to about 4 mm.

In detail, the transverse grooves have a variable width along their extension. Preferably, the transverse grooves 16 have a width decreasing from the circumferential groove 3 in the axial direction towards the circumferential groove 4.

The transverse grooves 16 are arranged along a curvilinear section with a predefined radius of curvature.

Preferably, the radius of curvature is between 50 mm and 85 mm, and for example is equal to 63 mm.

The circumferential rib 9 is delimited axially by the groove 4 which has a side wall which defines an undulating profile on the said rib 9. The undulating profile has a plurality of curvilinear portions 40 connected by cusps 39.

Conveniently, the undulating profile of the side wall 408 of the circumferential rib 9 increases the area of extension of the portion of the side wall 408 between two successive transverse grooves 16, providing greater grip in particular on wet surfaces and reducing, at the same time, the aquaplaning effect around bends.

Preferably, the cusps 39 are equal in number to the transverse grooves 16 and are joined to the latter by means of the first sipes 23.

The first sipes 23 are arranged along a curvilinear section with a predetermined radius of curvature. In particular, the radius of curvature of the first sipes 23 is the same as that of the transverse grooves 16.

The grooves 16 and the sipes 23 together with a section of the circumferential groove 3 and a curvilinear portion 40 of the groove 4 may define a kind of shark fin or claw on the rib 9.

The rib 9 may therefore be viewed as a succession of shark fins, the upper vertices of which, formed by the cusps 39, are all directed in the same direction.

The first sipes 23 preferably have a width less than or equal to 2 mm, for example equal to 1.5 mm.

Conveniently, the first sipes 23 have a depth less than 5 mm, preferably less than 3 mm, and for example equal to 2 mm.

Such an extension or arrangement of the first sipes 23 does not reduce excessively the rigidity of the circumferential rib portion 9 in which these sipes are formed.

The circumferential rib 9 also has a plurality of a second substantially transverse sipes 24.

The second transverse sipes 24 extend over approximately 30% of the width of the circumferential rib 9 from the circumferential groove 3.

The second sipes 24 extend in an intermediate circumferential position between two transverse grooves 16.

Conveniently, the second sipes 24 have a width less than 2 mm, more preferably less than 1.5 mm, and for example equal to 0.4 mm.

The second sipes 24 preferably have a variable depth along their extension.

The second sipes 24 preferably have a maximum depth of less than 7 mm.

In particular, the second sipes 24 have a smaller depth in the region of the circumferential groove 3, said depth decreasing, for example, from 6 mm to about 2 mm.

The circumferential rib 9 also has a plurality of third substantially longitudinal sipes 25.

The third sipes 25 extend longitudinally between two transverse grooves 16. Preferably, each substantially longitudinal sipe 25 extends from a transverse groove 16 as far as a circumferentially consecutive transverse groove 16.

The third sipes 25 extend circumferentially in an axially intermediate position between the circumferential groove 3 and the circumferential groove 4.

The third substantially longitudinal sipes 25 define two portions Z1, Z2 with a different solid/void ratio on the rib 9. In order to provide greater robustness in the central zone of the tyre, therefore ensuring a greater contact area, the axially inner portion Z1 has a greater solid/void ratio, while the portion Z2 has a smaller solid/void ratio.

In particular, the zone Z1 has a solid/void ratio less than 6%, for example equal to about 4.2%.

The greater contact area of this zone results in improved behaviour along the straight on dry surfaces, greater comfort, more uniform wear and a reduction in the noise produced by this zone.

The portion Z2 instead has a solid/void ratio less than 8%, and equal for example to about 6.4%. The greater solid/void ratio of Z2 compared to Z1 results in an increase in the number of incisions (grooves/sipes) present and consequently a greater drainage effect in this zone and an optimum grip on the wet and greater comfort.

The third transverse sipes 25 extend with a curvilinear progression. In other words, each substantially transverse sipe 25 is arranged along a curvilinear section substantially corresponding to a curvilinear section 40 of the groove 4, but with an opposite concavity relative to the equatorial plane 7.

The third substantially longitudinal sipes 25 have a width less than 2 mm, more preferably less than 1.5 mm, and for example equal to 0.4 mm. The third sipes 25 preferably have a maximum depth of less than 5 mm.

In particular, the third sipes 25 have a constant depth along their extension, which is preferably less than 3 mm and equal, for example, to about 2 mm.

The sipes 25 could, however, be omitted or replaced by sipes with a different progression, while keeping substantially unvaried the different solid/void ratio of the portions Z1 and Z2.

As previously mentioned, the central portion L1 comprises a second circumferential rib 10.

The circumferential rib 10 is situated between the circumferential groove 4, which separates it from the circumferential rib 9, and the circumferential groove 5, which separates it from the shoulder portion 12.

The circumferential rib 10 comprises a plurality of transverse sipes 17 which extend from the circumferential groove 5 over at least 50% of the width of the circumferential rib 10. Preferably, the transverse sipes 17 extend over the entire width of the rib 10.

The transverse sipes 17 are arranged along a curvilinear section with a predefined radius of curvature.

Preferably, the radius of curvature of the transverse sipes 17 is between 35 mm and 65 mm and for example equal to 50 mm.

Such an arrangement and extension of the transverse sipes 17 imparts robustness to the circumferential rib 10 so as to improve the traction/braking action thereof when travelling along the straight, while ensuring good flexibility which favours grip around bends.

The transverse sipes 17 also have a constant width along their extension. Conveniently, the transverse sipes 17 have a width less than 3 mm, preferably less than 1.5 mm and for example equal to 0.4 mm.

The transverse sipes 17 have a variable depth along their extension. In particular, the transverse sipes 17 have double-step depth with a smaller depth so as to form two raised portions in the vicinity of the circumferential grooves 4 and 5.

In detail, the depth of the transverse sipes 17, from being, for example, about 6 mm at the centre of the circumferential rib, decreases to about 2 mm in the region of the raised portions.

Such a small size of the sipes 17 ensures a high quantity of "ground contact rubber" along the circumferential rib 10, and therefore a low solid/void ratio and consequently excellent soft handling properties and low noise levels.

Most of the "ground contact rubber" also results in a greater quantity of rubber compound subject to wear and consequently an improved braking behaviour and greater mileage from the tyre.

The circumferential rib 10 is delimited axially by the groove 4 which has a side wall able to define an undulating profile on the same rib 10. The undulating profile has a plurality of curvilinear portions 50 connected by cusps 49.

Preferably, the cusps 49 are arranged opposite the transverse sipes 17 and are joined to them.

Conveniently, the undulating profile of the side wall of the circumferential rib 10 increases the contact surface area during travel around bends, improving the grip, in particular on wet surfaces, and reducing at the same time the aquaplaning effect.

The curvilinear portions 50 of the side wall of the circumferential rib 10 are not situated perfectly opposite the curvilinear portions 40 of the side wall of the rib 9, but are slightly staggered in the circumferential direction.

In the same way as the circumferential rib 9, two circumferentially consecutive sipes 17, a section of the circumferential groove 5 and a curvilinear portion 50 of the groove 4 define a kind of shark fin or claw on the rib 10.

The rib 10 may therefore be viewed as a succession of shark fins, the vertices of which, formed by the cusps 49, are all directed in the opposite direction to the vertices 39 of the rib 9.

Conveniently, the opposite direction of the cusps 39 of the circumferential rib 9 with respect to the cusps 49 of the circumferential rib 10 increases the traction/braking action around bends.

As mentioned above, the two shoulder portions 8 and 12 are axially delimited with respect to the central portion L1 of the tread 2 by the grooves 3 and 5, respectively.

Each shoulder portion 8 and 12 comprises transverse grooves 56, 66, respectively.

The transverse grooves 56 and 66 are repeated along the circumferential extension of the tyre.

The transverse grooves 56 and 66 have a centre line which is inclined with respect to the equatorial plane 7. The centre line of the transverse grooves 56 and 66 forms an angle of inclination relative to the equatorial plane 7 of between 70° and 120°.

The grooves 56 of the axially outer shoulder 8 extend from the axially outer edge of the tread band 2 as far as the groove 3 so as to define a row of blocks 15.

Similarly, the grooves 66 of the axially inner shoulder 12 extend from the axially inner edge of the tread band 2 as far as the groove 5, so as to define a row of blocks 25.

The transverse grooves 56, 66 have a constant width along their extension and, in particular, the transverse grooves 56, 66 have a width less than 7 mm, preferably less than 6 mm and for example equal to 5 mm.

In order to increase the structural rigidity of the shoulder portions, thereby improving the steering performance, silent travel and uniform wear, the blocks 15, 25 may be connected together by reinforcing elements 31 situated inside the grooves 56, 66. More particularly, considering the longitudinal section through a groove 56, 66 as shown in FIG. 3, each reinforcing element 31 may be defined by a portion of smaller depth provided in the zone of the transverse groove 56, 66 closest to the respective circumferential groove 3, 5. The depth of the transverse grooves 56, 66 in the region of the element 31 may range, by way of example, between 1.5 mm and 6 mm, and is preferably equal to 3 mm.

In the remaining portion, the groove 56, 66 has a variable depth which diminishes in the direction towards the axially outer edge of the tread band 2 as regards the circumferential groove 56 and towards the axially inner edge of the tread band 2, as regards the circumferential groove 66.

The grooves 56, 66 have a maximum depth in the portion closest to the reinforcing element 31.

The grooves 56, 66 have a maximum depth greater than 5 mm, preferably less than 10 mm and for example equal to 7.5 mm.

In order to provide the blocks 15, 25 with mobility in the transverse direction, thereby improving the comfort, the shoulder portions 8, 12 also have longitudinal grooves 57, 67.

The longitudinal grooves 57, 67 extend between two transverse grooves 56, 66, respectively.

The longitudinal grooves 57, 67 have a constant width along their extension. In detail, the longitudinal grooves have a width less than 3 mm, preferably less than 2 mm and for example equal to 1.5 mm.

The longitudinal grooves 57, 67 have a constant depth along their extension. In particular, the transverse grooves 57, 67 have a depth less than 3 mm, preferably less than 2 mm and for example equal to 1 mm.

The shoulder portion 8 also has in its axially innermost portion a plurality of sipes 30. The sipes 30 have two straight portions 32, 33 and a curvilinear portion 34.

Each curvilinear portion 34 is arranged so as to join together two straight portions 32, 33.

In particular, the sipes 30 have a straight section 32 substantially parallel to the groove 56 and a second straight section 33 inclined with respect to the equatorial plane 7. The second straight section 33 has an angle of inclination with respect to the equatorial plane of between 15° and 60°. The second straight section 33 has a length less than or equal to one third of the length of the first section 32.

Each sipe 30 extends substantially from a transverse groove 56 towards the axially adjacent circumferential groove 3.

In order to increase the structural rigidity of the shoulder blocks, the sipes 30 have a variable depth which diminishes at its ends, forming steps or portions of smaller depth.

In particular, each sipe 30 along the straight section substantially perpendicular to the equatorial plane 7 has a substantially constant depth greater than 3 mm and less than 8 mm, and preferably equal to 7.5 mm.

Along the curvilinear connecting section 34 and along the remaining straight section 33 inclined with respect to the equatorial plane 7, the sipe 30 has a smaller depth; along this section, in fact, the sipe 30 has a depth of between 1 mm and 5 mm and preferably equal to 1.5 mm.

However, the sipes 30 could have a different depth without departing from the scope of protection of the present invention.

The shoulder portion 12 has, instead, a plurality of sipes 41. The sipes 41 have three straight portions 42, 43, 44 and two curvilinear portions 45, 46.

Each curvilinear portion 45, 46 is arranged so as to join together two straight portions.

In particular, each sipe 41 as a first straight section 42 substantially parallel to the grooves 66, a second straight section 43 and a third straight section 44 inclined with respect to the equatorial plane 7. The second straight section 43 and the third straight section 44 have an angle of inclination of between 15° and 60° with respect to the equatorial plane.

The second straight section 43 and the third straight section 44 have a length less than or equal to the length of the first section 42.

Each sipe 41 extends substantially from a transverse groove 66 towards the consecutive circumferential transverse groove 66.

In order to increase the structural rigidity of the shoulder blocks, the sipes 41 have a variable depth which diminishes at its ends, forming steps.

In particular, each sipe 41 has a substantially constant depth greater than 3 mm and less than 8 mm, and preferably equal to 7.5 mm, along the straight section substantially perpendicular to the equatorial plane 7.

Along the curvilinear connecting sections 45, 46 and in the remaining straight sections 43, 44 inclined with respect to the equatorial plane, the sipe 41 has a reduction in depth; along the sections, in fact, the sipe 41 has a depth of between 1 mm and 5 mm, and preferably between 1.3 mm and 2.3 mm.

However, the sipes 41 could have different depths without departing from the scope of protection of the present invention.

The tread 2 (FIG. 2) has a void/solid ratio of about 0.16 in the shoulder portion 8; a void/solid ratio of about 0.01 in the circumferential rib 9; a void/solid ratio of about 0.04 in the circumferential rib 10; and a void/solid ratio of about 0.17 in the shoulder portion 12.

The different void/solid ratio on the two sides, i.e. lower ratio on the outer side and higher ratio on the inner side of the tyre, favours the behaviour of the motor car when travelling on a dry road surface.

Figure 4:
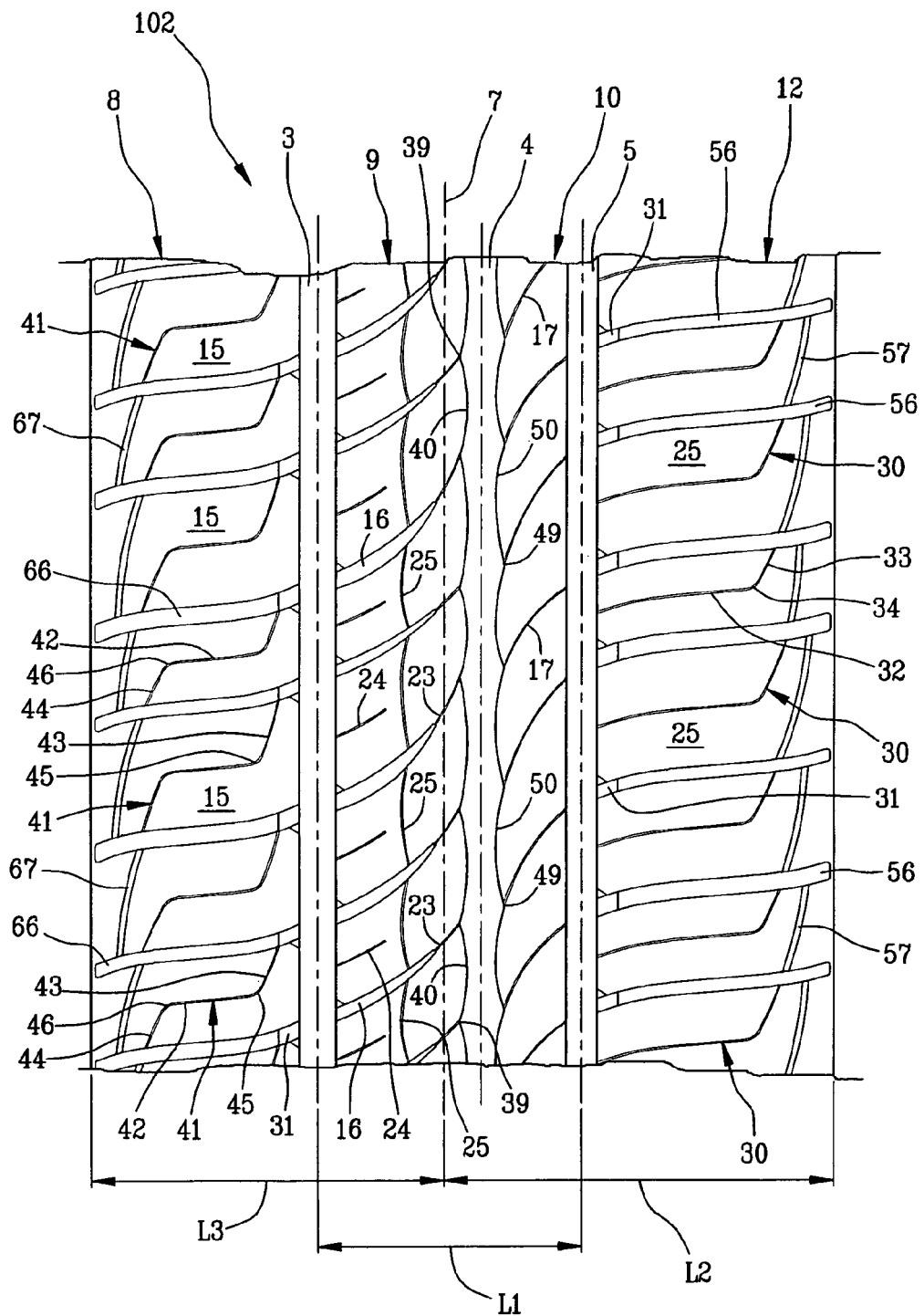
FIG. 4 is a plan view of a variant of the tread according to FIG. 2.

FIG. 4 shows a tread 102 which is a variant of that shown in FIG. 2 and in which identical parts are indicated by the same numbers. The tread 102 is entirely similar to the tread 2, except for the position of the circumferential ribs 9 and 10 and the direction of the "shark fins".

In this case, the portion L1 is obtained by rotating the portion L1 shown in FIG. 2 through 180°.

Figure 5:
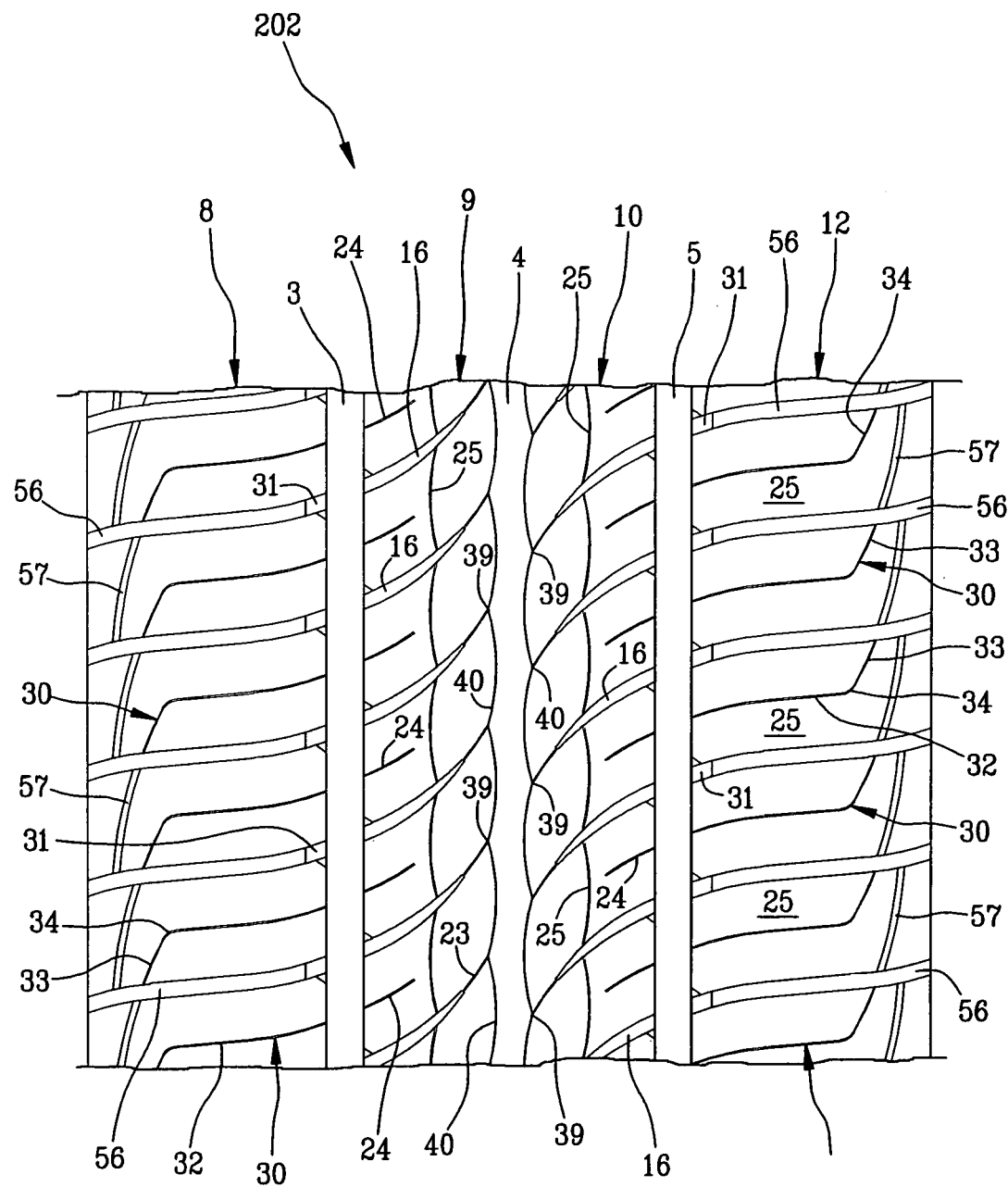
FIG. 5 is a plan view of a further variant of the tread according to FIG. 2.

FIG. 5 shows a tread 202 which is a variant of that shown in FIG. 2 and in which identical parts are indicated by the same reference numbers. The tread 202 is entirely similar to the tread 2 except for the circumferential rib 10.

The circumferential rib 10 in this case is entirely similar to the rib 9 according to FIG. 2, except for the direction of the "shark fins". In this case, the rib 10 is obtained by rotating the circumferential rib 9 according to FIG. 2 through 180° with respect to the centre axis of the groove 4.

Figure 6:
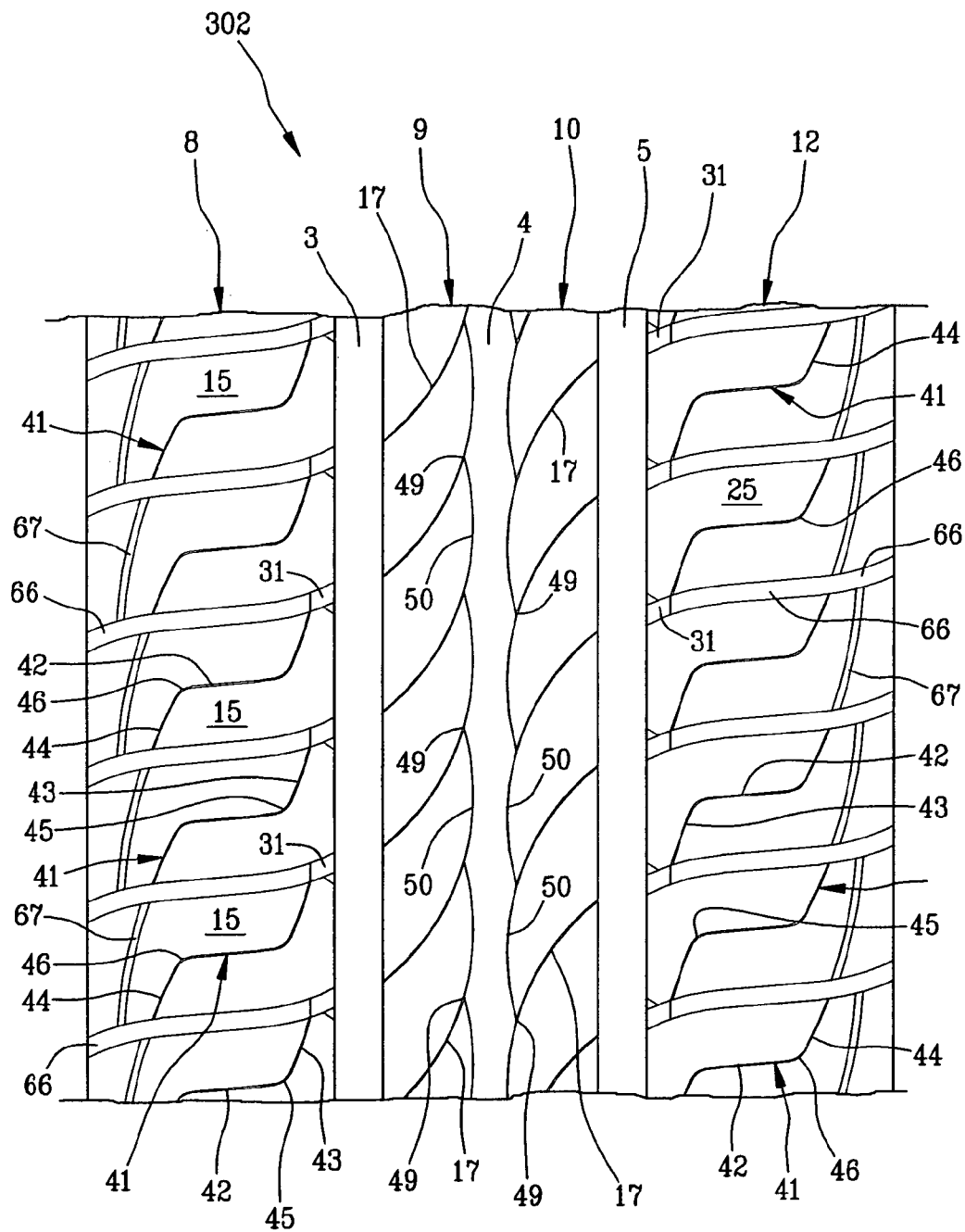
FIG. 6 is a plan view of a further variant of the tread according to FIG. 2.

FIG. 6 shows a tread 302 which is a further variant of that according to FIG. 2 and in which the identical parts are indicated by the same numbers. The tread 302 is entirely similar to the tread 2, except for the circumferential rib 9.

The circumferential rib 9 in this case is entirely similar to the rib 10 according to FIG. 2, except for the direction of the "shark fins." In this case the rib 9 is obtained by rotating the circumferential rib 10 according to FIG. 2 through 180° with respect to the centre axis of the groove 4.

An example of the tyre according to the invention, with the tread 2 according to FIGS. 1 and 2, was produced and comparison tests carried out with a comparison tyre P which has a tread with a central portion separated by two circumferential grooves from two shoulder portions.

The abovementioned central portion has two rows of central blocks provided with transverse grooves with a curvilinear progression.

The comparison tyre P was chosen because it has excellent characteristics and has been type-approved for motor cars with the same engine capacity and of the same type.

The size of the tyre according to the invention was 175/65 R 14, with a 6×14J rim and inflation pressure of 2.2 bar. The size of the comparison tyre was the same.

A Skoda Fabia 1400 motor car was first equipped with four tyres according to the invention and then with four comparison tyres.

Aquaplaning tests along the straight and around bends, braking tests on a dry and wet road surface, behaviour tests during travel on a dry and wet road surface, noise tests inside and outside the car and comfort tests were carried out.

The aquaplaning test along the straight was carried out along a straight section of smooth asphalt of predefined length (100 m) covered by a layer of water with a predefined constant depth (7 mm) which was automatically restored after each run of the test vehicle. The test was conducted with an initial constant speed (about 70 km/h) under maximum grip conditions and with acceleration until total loss of grip occurred.

The aquaplaning test around bends was carried out along a travel section with smooth and dry asphalt around a bend with a constant radius (100 m) of predefined length and comprising, along a final section, a zone of predefined length (20 m) flooded with a layer of water having a predefined depth (6 mm). The test was carried out at a constant speed for different speed values.

During the test the maximum centrifugal acceleration and the maximum speed of the car corresponding to total aquaplaning were recorded. The braking test was carried out on a straight section of asphalt, in both dry and wet conditions, recording the stopping distance from a predefined initial speed, typically 100 km/h in dry conditions and 80 km/h in wet conditions. The stoppage distance was determined as a mathematical mean of a series of successive recordings.

The travel behaviour test, in dry and wet surface conditions, was performed along predefined travel paths, typically around circuits which were closed to traffic. By simulating a few characteristic manoeuvres (such as lane changing, overtaking, slalom around cones, driving into and out of a bend) performed at a constant speed, as well as with acceleration and deceleration, the performance of the tyre was assessed by the test driver in the form of a numerical evaluation of the behaviour of the tyre when performing the abovementioned manoeuvres.

The scale of assessment is based on a subjective opinion expressed by the test driver testing and comparing in sequence the fitted tyres.

The evaluation of the comfort was based on the overall sensations of the test driver with regard to the capacity of the tyre to absorb the roughness of the road surface.

The results of the tests are shown in Table I where the evaluations are expressed as a percentage based on a value of 100 for the comparison tyre.

TABLE I

|  | Comparison tyre | Tyre acc. to invention |
|---|---|---|
| Aquaplaning around a bend | 100 | 103 |
| Aquaplaning along a straight | 100 | 100 |
| Braking on a dry surface | 100 | 103 |
| Braking on a wet surface | 100 | 100 |
| Behaviour on a dry surface | 100 | 101 |
| Behaviour on a wet surface | 100 | 104 |

In Table I the values greater than 100 indicate an improvement with respect to the comparison tyre.

The results of the tests show that the tyre according to the invention has a better behaviour than the comparison tyre, in particular during the tests for aquaplaning around a bend and behaviour on a wet surface.

Figure 7:
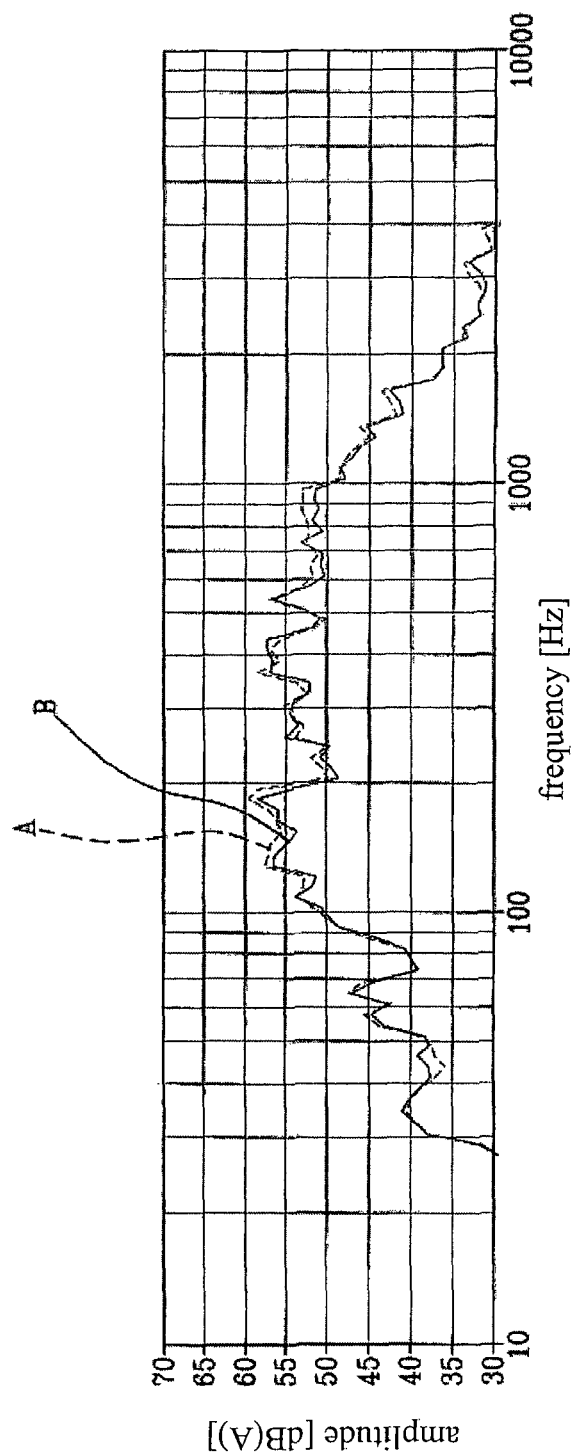
FIG. 7 is a graph showing the noise level of the tyre according to FIG. 1 compared to a reference tyre.

FIG. 7 shows graphs plotting the values of the internal noise level dB(A) against the frequency for the tyre according to the invention (graph B) and for the comparison tyre (graph A). As is known, the reference speed during these tests is 80 km/h.

The graphs in FIG. 7 show that the tyre according to the invention proved on average to be less noisy than the comparison tyre by about 2 dB (A).

The invention claimed is:

1. A motor car tyre having a tread comprising:
   a central portion straddling an equatorial plane, the central portion having:
      a first circumferential rib straddling the equatorial plane; and
      a second circumferential rib separated from the first circumferential rib by a first circumferential groove;
   a first shoulder portion separated from the first circumferential rib by a second circumferential groove; and
   a second shoulder portion separated from the second circumferential rib by a third circumferential groove, wherein
      said tread has a void ratio of less than 0.30,
      the first circumferential rib comprises transverse grooves which extend over at least 50% of the width of the first circumferential rib,
      the transverse grooves comprise at least one curvilinear section,
      said transverse grooves have a width less than that of the circumferential grooves,
      said first circumferential rib has at least one side wall with an undulating profile in a circumferential direction,
      the first shoulder portion has a void ratio smaller than that of the second shoulder portion, and
      at least one of the first and the second shoulder portions has a plurality of substantially transverse grooves capable of defining a circumferential row of blocks.

2. The tyre according to claim 1, wherein said side wall defines on said first circumferential rib an undulating profile comprising a plurality of cusps alternating with curvilinear portions.

3. The tyre according to claim 2, wherein the transverse grooves are positioned circumferentially to be joined to said cusps.

4. The tyre according to claim 1, wherein the transverse grooves have a variable width along their extension.

5. The tyre according to claim 1, wherein the first circumferential rib has two portions that have different void ratios.

6. The tyre according to claim 5, wherein the two portions include:
a first portion disposed between the equatorial plane and the second circumferential groove; and
a second portion disposed between the equatorial plane and the first circumferential groove, the first portion having a larger void ratio than the second portion.

7. The tyre according to claim 1, wherein said first circumferential rib has a plurality of first substantially transverse sipes.

8. The tyre according to claim 7, wherein said first substantially transverse sipes extend from a transverse groove toward an axially adjacent circumferential groove.

9. The tyre according to claim 7, wherein said first circumferential rib has a plurality of second transverse sipes.

10. The tyre according to claim 9, wherein said second transverse sipes extend from the second circumferential grooves.

11. The tyre according to claim 9, wherein said second transverse sipes extend from the second circumferential grooves and from the third circumferential grooves.

12. The tyre according to claim 1, wherein said second circumferential rib has an undulating wall with an undulating profile in the circumferential direction.

13. The tyre according to claim 1, wherein said second circumferential rib comprises a plurality of sipes which extend over at least 50% of the width of the second circumferential rib.

14. The tyre according to claim 13, wherein said plurality of sipes extends from a circumferential groove toward an axially adjacent groove.

15. The tyre according to claim 13, wherein said sipes have a variable depth along an extension thereof.

16. The tyre according to claim 15, wherein said sipes have a maximum depth in the axially central most portion of the first circumferential rib.

17. The tyre according to claim 16, wherein said sipes have a maximum depth of less than 8 mm.

18. The tyre according to claim 1, wherein said transverse grooves of the at least one of the first and the second shoulder portions have a variable depth along an extension thereof.

19. The tyre according to claim 1, wherein said transverse grooves of the at least one of the first and the second shoulder portions have a smaller depth along an axially inner edge.

20. The tyre according to claim 1, wherein at least one of the first and the second shoulder portions has a plurality of substantially longitudinal grooves.

21. The tyre according to claim 20, wherein said substantially longitudinal grooves extend between two circumferentially consecutive transverse grooves.

22. The tyre according to claim 1, wherein at least one of the first and the second shoulder portions has a plurality of sipes.

23. The tyre according to claim 22, wherein at least one sipe of the plurality of sipes has at least one first and one second straight section and at least one curvilinear connecting section.

24. The tyre according to claim 23, wherein said first straight section is substantially perpendicular to said equatorial plane.

25. The tyre according to claim 23, wherein said second straight section has a prechosen inclination with respect to said equatorial plane.

26. The tyre according to claim 1, wherein the first, second, and third circumferential grooves have a width between 5 and 16 mm, extremes included.

27. The tyre according to claim 1, wherein said first, second, and third circumferential grooves have a depth between 5 and 11 mm.

* * * * *